July 18, 1933.  H. SCHALL ET AL  1,918,429
CUTTLE FISH BONE HOLDER
Filed May 9, 1932
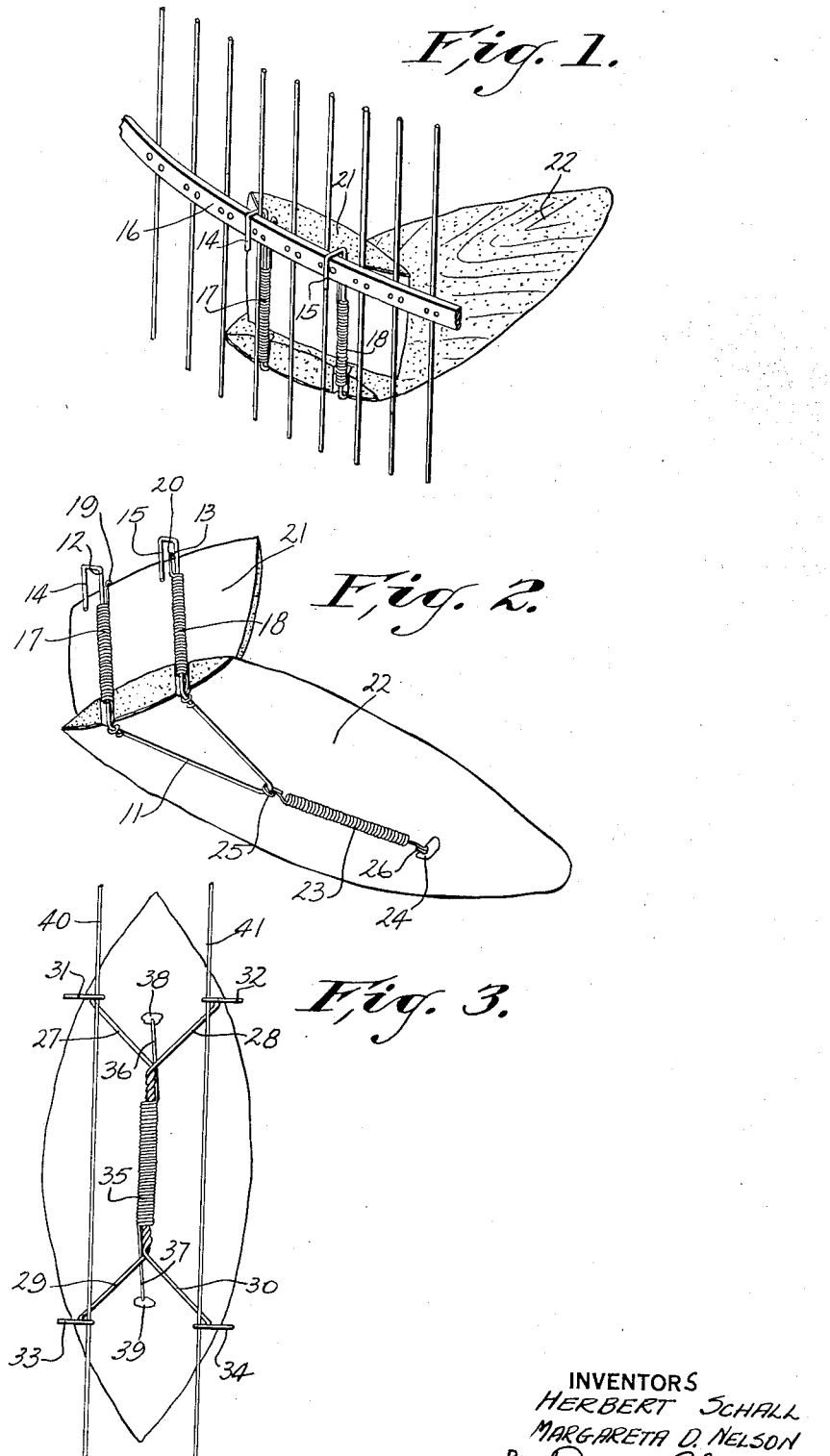
INVENTORS
HERBERT SCHALL
MARGARETA D. NELSON
By David Chamess
ATTORNEY Patented July 18, 1933

1,918,429

UNITED STATES PATENT OFFICE

HERBERT SCHALL AND MARGARETA D. NELSON, OF MILWAUKEE, WISCONSIN

CUTTLE-FISH-BONE HOLDER

Application filed May 9, 1932. Serial No. 610,049.

The present invention relates to improvements in cuttle-fish-bone holders for bird cages and particularly to a novel cuttle-fish-bone holder having horizontal and vertical supports integral with each other, for securing portions of cuttle-fish-bone in the cages.

Cuttle-fish-bone is derived from the cuttle-fish. It is a suitable product for the use of birds in their cages, and is readily adapted to aid the birds in maintaining their bills and claws in smooth, round and sharpened condition. To cut or trim these bills and claws by artificial means, often injures the delicate tissues that lie near the same, thus causing unknown suffering. Cuttle-fish-bone holders heretofore commonly used are provided with tin bands or exposed wires which come loose, thus allowing the birds to catch their toes, legs and wings between such bands and wires and the cage bars to which they are affixed. Cement and glue have been employed in the making of cuttle-fish-bone holders, but the known harmful effects of such products on the birds, prevents a wider use of such devices.

In the present invention, the cuttle-fish-bone holder once securely fastened in the cage in our device, is unable to work loose. Tin bands and exposed wires cannot harm the birds and adhesives disliked by the birds are also eliminated. We thus provide a practical holder for the cuttle-fish-bone and one that is most suitable for use in the cages.

One of the prime objects of this invention is to provide a cuttle-fish-bone holder for the use of birds in their cages, having a single piece of wire bent into horizontal and vertical integral supports, to define substantially as a unit, a right angle, and held by suitable securing means to portions of cuttle-fish-bone desired to be placed in a cage.

It is another object of the present invention to provide such integral horizontal and vertical supports for bird cages, wherein by means of hooks, outwardly turned from the ends of such vertical supports, the entire holder may be dependingly held in a cage.

It is another object of the invention herein, to provide a cuttle-fish-bone holder, wherein portions of cuttle-fish-bone may be yieldingly held together and securely retained within the cage, without loose or moving parts and without the employment of adhesives.

As a modified form of the present invention, another object is to provide two lengths of wire, twisted together lengthwise and along the greater central portion thereof, having arms extending radially of said central twisted portion to define substantially with such central section, an X-shape, said radial arms terminating on respective opposite sides of such central twisted portion in yokes.

The foregoing and such other objects of the present invention, as will appear hereinafter as the description proceeds, will be more readily understood from the following specification, reference being had to the accompanying drawing, in which exemplary forms of the invention are shown:

Fig. 1 is an exterior fragmentary view in perspective of a bird cage illustrating our cuttle-fish-bone holder assembly.

Fig. 2 is a bottom perspective view of the cuttle-fish-bone holder illustrated in Fig. 1.

Fig. 3 is a rear elevation of a modified form of a cuttle-fish-bone holder.

The invention preferably comprises a single piece of wire, bent to define substantially a right angle, having a V-shaped base 11 and parallel vertical segments 12 and 13, such vertical segments ending in integral yokes 14 and 15 bent horizontally and downwardly parallel to such vertical segments and of a much lesser length than said segments. The segments 12 and 13 are bent at right angles to the plane of the V-shaped base 11. The segments 12 and 13 end in parallel hooks 14 and 15, integral therewith, bent outwardly of said vertical segments and adapted to overlie and dependingly engage a cross-bar 16 of a bird cage as shown in Figure 1.

Coiled about the segments 12 and 13, are provided contractile springs 17 and 18, extending longitudinally around such segments, such springs having their upper ends 19 and 20 free and bent to form the hooks 19 and 20, in the direction of the base 11 of the support and adapted to engage a piece of cuttle-fish-bone 21, held between such hooked ends 19 and 20 and a piece of horizontally held cuttle-fish-bone 22.

The piece of horizontally held cuttle-fish-bone 22, is supported by the base 11 of the device and by the contractile spring 23, which joints the vertex of the base 11 to a cutout portion 24 on the underside of the horizontally held piece of cuttle-fish-bone 22. The spring means 17 and 18 and 23, of the device, impart a resiliency to it for yieldingly retaining both pieces of cuttle-fish-bone in right-angle juxtaposition. Spring 23 has looped hooked terminals 25 and 26. The upper free ends 19 and 20 of the longitudinally disposed springs 17 and 18, are likewise looped to prevent injury to the birds, should the assembly become disengaged for any reason. In assembly, after obtaining pieces of cuttle-fish-bone of the desired shapes, as shown in the drawings, the horizontal piece 22 is mounted on the base 11 of the support with its flat end positioned against the inside portions of the vertical segments of the support, transverse the same where the said segments adjoin the base. The coil 23 is attached to the vertex of the base 11 and to the cut-out portion of the horizontal cuttle-fish-bone. The vertically disposed portion of cuttle-fish-bone is then placed in position transverse and near the flat end of the horizontal piece of cuttle-fish-bone, against the vertical coils 17 and 18. The hooked ends 19 and 20 of the coils 17 and 18 are stretched and fastened to the top of the vertical piece of cuttle-fish-bone. The coils 17 and 18 are curled at their lower ends about the base 11 of the support, a bit removed from where the base joins the vertical segments of the support. When a bird lights upon the horizontal portion of cuttle-fish-bone, its weight tends to depress the same, and the contractile features of the springs tend to keep the depressed portion in normal relationship with the other portion of cuttle-fish-bone. The holder does not come in contact with the bird and likelihood of injury is remote. The flat end of the horizontal cuttle-fish-bone, where it meets the vertical segments of the support, is notched to permit of a close fit between said segments and the flat end.

In the modified form of our invention, shown in Figure 3, two lengths of wire are twisted together lengthwise and centrally of each other so as to leave arms 27, 28, 29 and 30 radially disposed to such center section so twisted, and in the same plane therewith, said radially disposed arms, terminating in yokes 31 and 32, 33 and 34, to define a substantially X-shaped device, said yokes bent horizontally and forwardly of said central section. Around the central twisted section of these wires, there is coiled, spring 35, longitudinally wound having ends 36 and 37 hooked to the cut-out portions 38 and 39 of the cuttle-fish bone which it is desired to employ in the holder. In placing the holder in the cage, the yokes are spread apart to grasp therebetween, vertical bars 40 and 41 of a cage. When such bars have been so grasped, the resiliency of the holder will naturally draw the cuttle-fish-bone to the bars of the cage as the radial arms contract. Thus a secured holder is afforded, which may be readily detached from the cage.

While the preferred form of the invention has been shown and described in the foregoing, it is to be understood that this invention is capable of embodying numerous variations in structural detail and modifications as to form, without departing from the spirit of the invention nor the scope of the appended claims.

We claim:

1. A cuttle-fish-bone holder for bird cages, comprising a horizontal support formed of wire, a pair of vertically disposed hooked segments integral with said horizontal support, and means for securing portions of cuttle-bone in said holder.

2. A cuttle-fish-bone holder for bird cages comprising a horizontal V-shaped wire support, a pair of vertically disposed hooked segments integral therewith, and means for securing portions of cuttle-bone in said holder.

3. A cuttle-fish-bone holder for bird cages comprising a horizontal V-shaped wire support, a pair of vertically disposed hooked segments integral therewith, and spring means for securing portions of cuttle-bone in said holder.

4. A cuttle-fish-bone holder for bird cages, forming substantially a right angle, comprising a horizontal V-shaped wire base, a pair of vertically disposed segments integral therewith, each provided with a hook adapted to dependingly engage the cross-bar of a bird cage, and spring means for securing portions of cuttle-fish-bone in said holder.

5. A cuttle-fish-bone holder for bird cages including a length of wire, hooks formed in the ends of said wire adapted to engage a cross-bar of a bird cage, vertically downwardly disposed segments of said wire adjoining said hooks, a horizontally disposed V-shaped base joining said vertical segments at a right angle thereto, a coiled tension spring member having hooked terminals adapted to connect the vertex of said V-shaped base with a piece of cuttle-fish-bone held horizontally thereon, a tension spring coiled about each vertical segment and fixedly secured at its lower end having a free upper end provided with a hook adapted to engage a piece of cuttle-fish-bone held between said hook and the horizontally held cuttle-fish-bone.

6. A cuttle-fish-bone holder for bird cages including a length of wire, hooks formed in the ends of said wire adapted to dependingly engage a cross-bar of a bird cage, vertically downwardly disposed segments of said wire adjoining said hooks, a horizontally disposed V-shaped portion joining said vertical segments at substantially a right angle thereto, a coiled tension spring member having hooked terminals adapted to connect the vertex of said V-shaped portion with a piece of cuttle-fish bone held horizontally thereon, a tension spring coiled about each vertical segment and fixedly secured at its lower end and having a free upper end provided with a hook adapted to engage a piece of cuttle-fish bone held between said hook and the horizontally held cuttle-fish-bone.

HERBERT SCHALL.
MARGARETA D. NELSON.